Patented July 26, 1949

2,477,462

UNITED STATES PATENT OFFICE 2,477,462

POLYMERIC COLOR FORMERS FROM HYDROXYL POLYMERS CONTAINING REACTIVE KETALDONE GROUPS WITH REACTIVE METHYLENE AND AMINO COLOR FORMERS

David Malcolm McQueen, Wilmington, Del., assignor to E. I. du Pont de Nemours & Company, Wilmington, Del., a corporation of Delaware No Drawing. Application March 26, 1946,
Serial No. 657,331

9 Claims. (Cl. 260—67.5)

This invention relates to polymeric color formers or dye intermediates and, more particularly, to such intermediates which are capable of coupling with diazonium salts to give azo dyes or with oxidized primary aromatic amine developing agents to given quinoneimine dyes or azomethine dyes.

An object of this invention is to provide new polymeric color formers or dye intermediates. A more specific object is to provide such dye intermediates which can be used as coupling components in the arts of fiber and film dyeing. A further object is to provide new hydrophilic polymeric color formers which can be used as binding agents for silver halides. Still other objects will be apparent from the following detailed description of the invention.

The above objects are attained by reacting a polymeric ketaldone with a color former having a ketaldone-reactive group and recovering a polymeric color former. More specifically interpolymers of vinyl alcohol and polymerizable alpha, beta-ethylenically unsaturated ketaldones, which interpolymers contain recurring vinyl alcohol units and acyclic aldehyde or ketone groups, are reacted with a color former containing either a reactive methylene group, a reactive primary or secondary amino or amide group, or a thiol group whereby the carbon atom of the carbonyl group of said aldehyde or ketone becomes directly linked to the carbon, nitrogen, or sulfur atom of the said reactive groups. The polymerizable ethylenically unsaturated ketaldones all have a vinyl or vinylidene group attached to an oxocarbonylic group. Typical of these are ketaldones of the structure

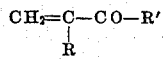

where R and R' are hydrogen or hydrocarbon.

The interpolymers of vinyl alcohol and the polymerizable alpha,beta-ethylenically unsaturated ketaldones useful in making the novel polymeric color formers of this invention can be made by the methods described in assignee's United States application Serial No. 581,337 filed March 6, 1945 and now abandoned. The most practical of such methods involves interpolymerizing a vinyl ester, e. g., vinyl acetate, with allylidene diacetate in the presence of a catalyst which catalyzes the polymerization of vinyl compounds, e. g., organic peroxides including benzoyl peroxide, diethyl peroxide, and ammonium persulfate. In the allylidene diacetate, the aldehyde group potentially present is inactive and may be referred to as a "masked aldehyde" group. Because of the unreactivity of the aldehyde group in the polymer-forming reaction, the polymers are linear in character and may be of very high molecular weight. The masking ester groups in the interpolymers can be easily removed whereby recurring aldehyde groups are then formed. This may be accomplished by hydrolysis, saponification, or alcoholysis reactions as described in the aforesaid application.

The nature of the invention will be further illustrated with reference to vinyl acetate/allylidene diacetate copolymer containing the said components in an interpolymerization weight ratio of 10 to 1 and prepared by the process described in Example II of aforesaid application Serial No. 581,337. This interpolymer is hydrolyzed to a vinyl alcohol/acrolein interpolymer by dissolving it in an alcohol, e. g., methanol or ethanol, or in a mixture of an alcohol and a hydrocarbon, e. g., toluene, and treatment with a suitable hydrolyzing agent or catalyst, e. g., 10% NaOH or KOH solution. The interpolymers resulting from the hydrolysis reaction contain hydroxyl and aldehyde groups and are suitable for reaction with dye intermediates or color-formers of various types which possess ketaldone-reactive groups. For example, the above interpolymer is dissolved in aqueous alcohol solution and stirred at room temperature while adding an aqueous alkaline solution of a dye intermediate, e. g., 1,5-aminonaphthol. After stirring for three hours at room temperature, the temperature is allowed to rise to 50° C. and is maintained there for one hour. At the end of this time the solution is cooled and stirred while adding a non-solvent for the interpolymer, such as acetone. When the color-yielding polymer has been precipitated, it is filtered and washed thoroughly with a solvent for the unreacted dye intermediate. With 1,5-aminonaphthol, such a solvent is a mixture of alcohol and acetone in the ratio of 70 parts to 30 parts by weight. The resulting isolated interpolymer is a light-colored solid which may be dissolved in water containing 10% ethanol by weight by heating and stirring at a temperature of 60° to 70° C. It contains a plurality of aminonaphthol residues in each molecule of interpolymer. The aqueous solution of the polymeric color former may thus be incorporated in an article in which color is desired, e. g., a photographic gelatin/silver halide emulsion or a viscose fiber. Color is then produced, for example, by treatment with a diazonium salt or during color coupling development of latent silver halide images with p-phenylene diamine.

Polymers suitable for use in preparing the polymeric color-formers or dye intermediates of the present invention are members of the class of polymeric aldehydes or ketones having a plurality of aliphatic hydroxyl groups attached to intralinear carbons and which are water-soluble or possess a hydrophilic character. Since the preferred final products are hydrophilic, during the preparation of the intralinear hydroxyl-containing polymeric aldehydes and ketones from vinyl esters and polymerizable alpha,beta-ethylenically unsaturated ketaldones or their precursors in the form of the "masked" aldehydes, it is important that the interpolymerizing components be present in ratios of approximately 1 mol of the polymerizable ketaldone to 5–40 mols of the vinyl ester. As the ketaldone component there may be used in certain cases monomeric vinyl or vinylidene ketones, for example, methyl vinyl ketone or methyl isopropenyl ketone. However, as pointed out previously, polymerizable alpha-beta-ethylenically unsaturated compounds containing "masked" aldehyde groups can also be interpolymerized with the vinyl ester with subsequent hydrolysis to free the hydroxyl and the aldehyde groups. The aldehyde groups may be "masked" prior to the interpolymerizing reaction by converting them to diesters, acetals, ester-acetals, etc. This is exemplified by the interpolymer of vinyl acetate and allylidene diacetate (a carboxylic acid diester of acrolein).

Prior to hydrolysis the vinyl ester/allylidene diacetate interpolymer is quite unsuitable for use in the present invention. However, after hydrolysis both the hydroxyl groups, which impart a hydrophilic character, and the aldehyde groups, which impart chemical reactivity, become available. It is important during the hydrolysis that alkaline conditions prevail, since under acid conditions the polymer reacts with itself to give an insoluble and infusible material.

Interpolymers suitable for reacting with the dye intermediates have the recurring units structure:

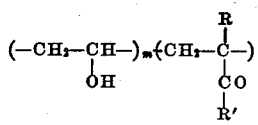

and after reaction with the color former the unit structure of the polymeric molecule is:

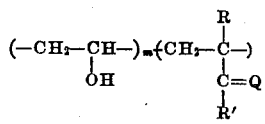

where R and R' are hydrogen or a hydrocarbon radical, $m$ is a number between 10 and 50, and Q is 1 or 2 color-former nuclei.

Color formers suitable for reaction with the polymeric ketaldones contain a group of the structure

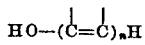

where $n$ is 1 or 2, and may also contain a primary amino group. Compounds containing such a structural group include active methylene compounds, e. g., acylacetamides, acylacetic acid esters, cyanoacetic acid esters, cyanoacetic acid amides, and pyrazolones; aminophenols, aminopyrazolones, and aminoacylacetamides.

During the condensation, reaction water is eliminated by reaction of the ketaldone group and the reactive methylene group ($-CH_2-$) or the primary amino group. The exact structure of the polymeric color former compounds formed is not known for certainty and is impossible to ascertain in a polymeric molecule of this type. By analogy with reactions involving monomeric compounds of these structures, the possible structural formulae of the color-forming portion of the polymeric color formers of this invention may be shown as follows:

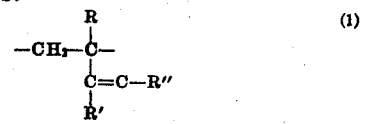

and

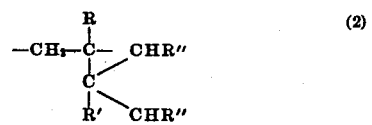

for reactive methylene color formers and

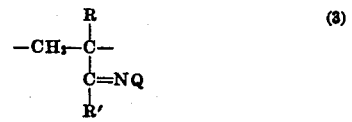

and

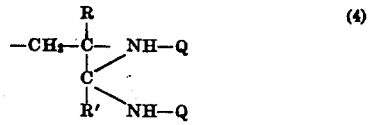

for color formers having one ketaldone-reactive amino group. When monomeric compounds containing both reactive methylene ($-CH_2-$) groups and primary amino ($-NH_2$) groups are condensed, combinations of the above linkages may occur. In formulae (1), (2), (3), and (4) R and R' are hydrogen or a hydrocarbon radical; $R''C<$ corresponds to the same radical in a reactive methylene compound of the formula

where $R''C<$ is the residue of the reactive methylene compound after eliminating the two hydrogen atoms of the reactive methylene group

In Formula (2) R'' has the same significance as in Formula (1). In this case two molecules of a reactive methylene compound react with each carbonyl group of the polymer.

In Formula (3), $=NQ$ corresponds to the same radical of a color former of the formula

where $>NQ$ is the residue of the amino color former after eliminating the two hydrogen atoms of the amino group and Q is the atoms constituting the rest of the color former.

In Formula (4) Q has the same significance as in Formula (3). During the condensation two mols of a color former $H_2N-Q$ react with each carbonyl group of the polymer.

The resulting polymeric color formers of Formulae (3) and (4) on coupling with, for example, diazotized aromatic amines yield an ultimate product which is a polymeric dye. On the other hand, when reaction of the oxocarbonyl group in the polymeric ketaldone occurs with a compound of Formulae (1) and (2), the linkage between the polymer and the coupling component may be ruptured upon coupling with a diazotized aromatic amine with the production of a monomeric dye. Since the monomeric dyes are usually quite water-insoluble in contrast to the monomeric coupling component, even these possess considerable utility. In fact one embodiment of this invention contemplates the formation of polymeric dye intermediates through reaction of the polymeric ketaldone with a monomeric color-former or dye intermediate through the coupling function. These polymeric color formers are used in silver halide emulsion layers. Upon exposure and color development, a water-insoluble monomeric dye is formed at the image areas. By treatment with a hydrolytic agent, splitting of the uncoupled polymeric dye intermediate occurs with consequent removal of the water-soluble monomeric dye intermediate from the film. Thus the final film contains no uncoupled dye intermediates which may give rise to color instability.

In the following examples all parts are given in terms of weight, all temperatures are centigrade, and all operations involving light-sensitive materials are carried out in the absence of actinic radiation. These examples are intended as illustrative only and should not be conceived as limiting the invention in any way.

*Example I*

A mixture of 25 parts of hydrolyzed vinyl acetate/allylidene diacetate interpolymer (mole ratio 10/1 described in Example II of application Serial No. 581,337), 17 parts of 1-phenyl-3-methyl-5-pyrazolone, 0.5 part of sodium methylate and 150 parts of dioxane is heated and stirred at 70° for four hours. The solid is collected on a filter and washed repeatedly with methanol to remove unreacted 1-phenyl-3-methyl-5-pyrazolone. The granular polymer is then dried. It has the following probable unit structure:

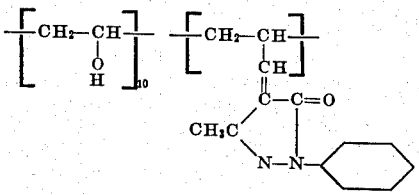

When coupled with oxidized diethyl-p-phenylenediamine a bright magenta dye is produced.

*Example II*

A mixture of 62.5 parts of methanol-wet (40% solids) hydrolyzed vinyl acetate/allylidene diacetate interpolymer (mole ratio about 20/1 prepared by the method described in Example II of application Serial No. 581,337) 5 parts of 1-m-amino-phenyl-3-methyl-5-pyrazolone, 44.5 parts of 5% sodium hydroxide, 45 parts of water, and 126 parts of ethanol is heated at 80° for four hours. Complete solution takes place in about one hour. The reaction mixture is cooled and diluted with 2000 parts of methanol. About ten parts of acetic acid is then added and the polymer precipitates as small granules. It is collected on a filter and then washed by decantation in four changes of ethanol. After drying, 25 parts of light tan solid is obtained. This polymer has the following probable unit structure:

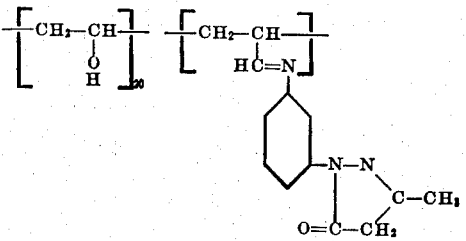

A solution is prepared by stirring at 70° for one hour ten parts of this polymer, 47 parts of ethanol, and 142 parts of water. To one-half of this solution is added 31 parts of 3N ammonium bromide and two parts of 0.5N potassium iodide. The mixture is stirred at 40° while adding a solution of 29 parts of 3N silver nitrate, 50 parts of water, and 17 parts of 28% ammonium hydroxide during one minute. After stirring for a total of one-half hour, the emulsion is coagulated by the addition of 75 parts of 10% sodium sulfate solution. The precipitate is washed in running water for one hour after which the excess water is drained off. The emulsion is redissolved by stirring at 65° with a mixture of 20 parts of ethanol and 60 parts of water for 30 minutes. The remainder of the original polymer solution is then added and the solution stirred 15 minutes longer. After cooling to 30°, the emulsion is coated on baryta-sized white paper and on cellulose acetate film base. The resulting paper and film are exposed to light from an object to form latent images, then developed in a solution made by admixing the following components:

| | Parts |
|---|---|
| p-Aminodiethylaniline hydrochloride | 2 |
| Sodium sulfite (anhydrous) | 10 |
| Sodium carbonate (anhydrous) | 20 |
| Potassium bromide | 2 |
| Water to make | 1000 |

The paper and film are then washed, bleached in 4% potassium ferricyanide, fixed in 25% sodium thiosulfate and washed. The resulting paper and film contain a bright, strong magenta negative dye image.

*Example III*

A mixture of 19 parts of p-aminoacetoacetanilide, 500 parts of ethanol, 100 parts of water, and 60 parts of hydrolyzed vinyl acetate/allylidene diacetate interpolymer (described in Example II) was heated at the reflux temperature for five hours. A clear solution resulted. This was cooled, 100 parts of 10% acetic acid was added and the polymer was then caused to precipitate by the addition of 300 parts of methanol with rapid stirring. The solid was collected on a filter, then washed thoroughly with methanol. After drying 55 parts of light buff powder was obtained. This polymer is soluble in aqueous ethanol and has the following probable unit structure:

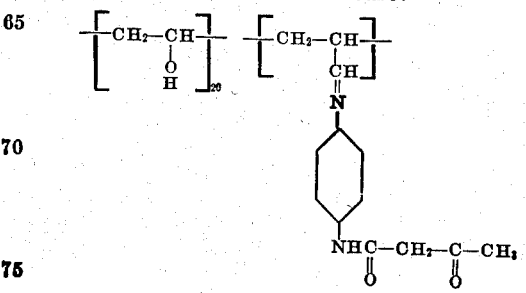

The material is incorporated into a photographic emulsion which is subsequently coated on a support, exposed, and developed as described in Example II to give a yellow dye image.

*Example IV*

An interpolymer of vinyl acetate and methyl vinyl ketone (mole ratio 10/1) is made as follows: A mixture of 172 parts of vinyl acetate, 14 parts of methyl vinyl ketone, 2 parts of ammonium persulfate, 0.2 part of sodium bisulfite, 6 parts of sodium dodecyl sulfate, and 600 parts of water is shaken at 40° for 16 hours in a sealed reactor. The emulsion is coagulated with sodium chloride solution, washed and dried to give 186 parts of polymer. This product is hydrolyzed by dissolving it in 1000 parts of methanol containing 18 parts of potassium hydroxide and heating at the reflux temperature for two hours. The polymer which precipitates is collected on a filter, washed with methanol, and dried.

One hundred parts of the hydrolyzed vinyl acetate/methyl vinyl ketone interpolymer, 1000 parts of ethanol, 200 parts of water, 20 parts of 1-m-aminophenyl-3-methyl-5-pyrazolone, and 100 parts of 5% sodium hydroxide is heated at 80° for five hours. The reaction mixture is cooled, neutralized with 30% acetic acid and the resulting polymer is precipitated by the addition of 1000 parts of methanol with stirring. The solid is collected on a filter and washed thoroughly with methanol. After drying, 110 parts of light tan powder are obtained. This material gives a magenta color when coupled with oxidized diethyl-p-phenylenediamine. When coupled with diazotized sulfanilic acid a bright yellow dye is produced.

In place of the polymeric ketaldones listed in the examples, there may be used hydrolyzed interpolymers of vinyl esters with 2-methylallylidene diacetate, 2-phenyl allylidene diacetate, allylidene acetate-chloride, allylidene acetate-ethoxide, allylidene propionate-propoxide, 2-chloroallylidene diacetate, allylidene dipropionate, allylidene dibenzoate, allylidene benzoate-acetate, allylidene benzoate-ethoxide, ethyl vinyl ketone, methyl isopropenyl ketone, phenyl vinyl ketone, and ethyl isopropenyl ketone. Other hydrolyzable vinyl esters can be used as the ester component but for reasons of convenience and economy vinyl acetate is preferred. Suitable additional vinyl esters include vinyl chloroacetate, vinyl propionate, and vinyl isobutyrate.

Similarly, in place of the color formers of the examples one may substitute others including m-amino-phenol, o-aminophenol, m-hydroxybenzamide, 1,5-amino-naphthol, J-acid, H-acid, 2-hydroxy-4-methylthiophenol, 3-hydroxythionaphthene, and N-beta-naphthylhomophthalimide.

Similarly a novel class of polymeric acylacetamide color formers are provided by substituting for the particular acetoacetanilide of Example I other such amides having a different acyl radical RCO- attached to the CH₂CONH- radical. Such class may be typified by the general formula RCO-CH$_2$CO-NH-R$^2$-X where RCO is an acyl radical and R$^2$ is an arylene radical, e. g., phenylene, naphthylene, etc. and X is a ketaldone reactive group. Suitable acyl radicals include those of aliphatic, cycloalphatic, aromatic and heterocyclic compounds.

Among the acylacetanilides which can be reacted with the polymeric aldehydes as disclosed in Example III are acetoacet-p-bromanilide, acetoacet-2-chloranilide, acetoacet-2,4-dichloranilide, acetoacet-2,5-dichloranilide, acetoacet-m-nitroanilide, o-methoxyacetoacetanilide, p-hydroxyacetoacetanilide, acetoacet-p-anisidide, acetoacet-2-bromo-p-phenetidide, acetoacet-p-aminoanilide, acetoacet-m-dimethylaminoanilide, 2-acetoacetamino-benzthiazole, 2-acetoacetamino-4-methyl-thiazole, furoylacetanilide, benzoylacetanilide, p-nitrobenzoylacetanilide, p-amino-benzoylacetanilide.

The products have been found to be of a special value in photographic elements and processes of color photography utilizing color forming development. They may, for example, be added in aqueous solution to a photographic polyvinyl alcohol/silver bromide emulsion and coated on a support, such as paper or cellulose acetate film. After exposure to an object scene, color is produced at the image areas by known means, such as color development with N p-aminodiethylaniline, treatment with a diazonium salt followed by selective bleaching or the like. For color photography, as is well known, the materials must be selected to give the subtractive colors of magenta, yellow and blue-green and it is customary to utilize three intermediates each of which produces one of the three necessary colors. For example, a film may be built up by coating on a cellulose nitrate film base (1) a polyvinyl alcohol/silver halide emulsion containing a reaction product of a vinyl alcohol/acrolein interpolymer (mole ratio 20/1) with a 1,5-aminonaphthol, (2) a clear polyvinyl alcohol separator, (3) a polyvinyl alcohol/silver halide emulsion containing the reaction product of a vinyl alcohol/acrolein interpolymer (mole ratio 20/1) with 1-m-aminophenyl-3-methyl-5-pyrazolone, (4) a layer of a yellow colloidal silver dispersed in polyvinyl alcohol, and (5) a polyvinyl alcohol/silver halide emulsion containing the reaction product of a vinyl alcohol/acrolein interpolymer (mole ratio 20/1) with (p-aminobenzoyl)acetanilide. The sensitivities of the emulsion layers are adjusted, as is known in the art, so that exposure to an object scene gives color separation. Development first with a metol-hydroquinone developer, re-exposure and development with p-aminodiethylaniline, followed by treatment with potassium ferricyanide solution and fixing gives a positive image in full color.

The new polymeric dye intermediates of the present invention are also useful in certain non-photographic dyeing applications. Thus they are useful in the process of United States patent application of H. Woodward, Serial Number 411,262, filed September 17, 1941, now United States Patent No. 2,371,052, wherein polymeric dye intermediates are spun in viscose yarn or other fibers or filaments followed by generation of the dye by treatment with a diazotized aromatic amine. Dyes produced in this way possess outstanding washing and laundering fastness.

As many widely different embodiments of this invention can be made without departing from the spirit and scope thereof, it is to be understood that the invention is not to be limited except as defined by the claims.

What is claimed is:

1. A polymeric color former obtained by the condensation of a polymeric ketaldone having recurring units of the formula:

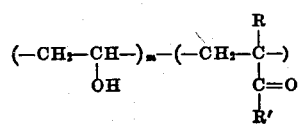

where $m$ is a number from 10 to 50, R and R' are members of the group consisting of hydrogen and hydrocarbon radicals, with a color former selected from the group consisting of acylacetamides, acylacetic acid esters, cyanoacetic acid esters, cyanoacetic acid amides, pyrazolones, aminopyrazolones and aminoacylacetamides, with the elimination of water.

2. A polymeric color former obtained by the condensation of a polymeric ketaldone having recurring units of the formula:

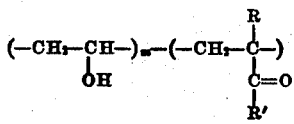

where $m$ is a number from 10 to 50, R and R' are members of the group consisting of hydrogen and hydrocarbon radicals, with a pyrazolone color former, with the elimination of water.

3. A polymeric color former obtained by the condensation of a polymeric ketaldone having recurring units of the formula:

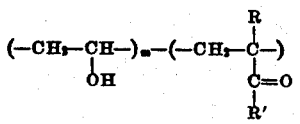

where $m$ is a number from 10 to 50, R and R' are members of the group consisting of hydrogen and hydrocarbon radicals, with an acylacetamide color former, with the elimination of water.

4. A polymeric color former obtained by the condensation of a polymeric ketaldone having recurring units of the formula:

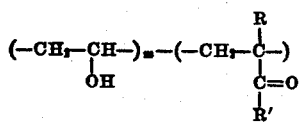

where $m$ is a number from 10 to 50, R and R' are members of the group consisting of hydrogen and hydrocarbon radicals, with an aminophenyl pyrazolone, with the elimination of water.

5. A polymeric color former obtained by the condensation of a polymeric ketaldone having recurring units of the formula:

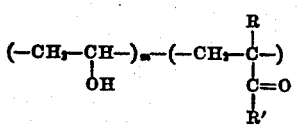

where $m$ is a number from 10 to 50, R and R' are members of the group consisting of hydrogen and hydrocarbon radicals, with an amino acylacetaromatic amide, with the elimination of water.

6. A polymeric color former which has recurring units of the formula:

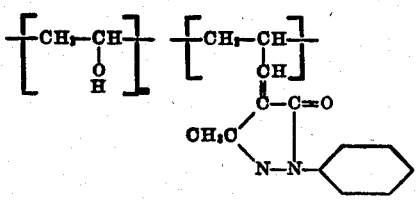

where $m$ is a number from 10 to 50.

7. A polymeric color former which has recurring units of the formula:

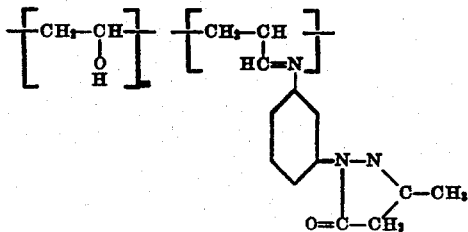

where $m$ is a number from 10 to 50.

8. A polymeric color former which has recurring units of the formula:

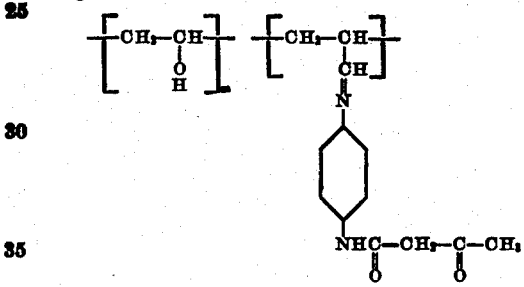

where $m$ is a number from 10 to 50.

9. The process which comprises condensing a polymeric ketaldone having recurring units of the formula:

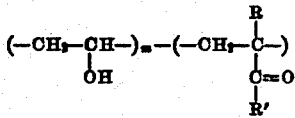

where $m$ is a number from 10 to 50, R and R' are members of the group consisting of hydrogen and hydrocarbon radicals, with a color former selected from the group consisting of acylacetamides, acylacetic acid esters, cyanoacetic acid esters, cyanoacetic acid amides, pyrazolones, aminopyrazolones and aminoacylacetamides, in an aqueous alkaline medium.

DAVID MALCOLM McQUEEN.

REFERENCES CITED

The following references are of record in the file of this patent:

UNITED STATES PATENTS

| Number | Name | Date |
|---|---|---|
| 2,332,897 | D'Alelio | Oct. 26, 1943 |